(12) United States Patent  (10) Patent No.: US 6,707,054 B2
Ray  (45) Date of Patent: Mar. 16, 2004

(54) SCANNERLESS RANGE IMAGING SYSTEM HAVING HIGH DYNAMIC RANGE

(75) Inventor: Lawrence A Ray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/103,640

(22) Filed: Mar. 21, 2002

(65) Prior Publication Data

US 2003/0178549 A1 Sep. 25, 2003

(51) Int. Cl.$^7$ ................................................. G01V 8/00
(52) U.S. Cl. ........................... 250/559.38; 250/214 VT; 356/5.1; 356/5.01
(58) Field of Search ........................... 250/208.1, 559.38, 250/214 R, 214 VT, 206, 226, 234, 201.5, 201.6; 356/5.15, 5.1, 5.01, 3, 4.1, 4.01; 396/89, 106, 109, 80, 111, 114, 119, 120; 382/106

(56) References Cited

U.S. PATENT DOCUMENTS

| | | | | |
|---|---|---|---|---|
| 3,971,065 | A | | 7/1976 | Bayer .......................... 358/41 |
| 4,690,555 | A | * | 9/1987 | Ellerbroek .................. 356/121 |
| 4,935,616 | A | * | 6/1990 | Scott ..................... 250/214 VT |
| 5,579,103 | A | * | 11/1996 | Tachikawa .................. 356/5.1 |
| 5,990,506 | A | * | 11/1999 | Fossum et al. ............. 257/294 |
| 6,088,086 | A | * | 7/2000 | Muguira et al. ........... 356/5.15 |
| 6,118,946 | A | | 9/2000 | Ray et al. ..................... 396/89 |
| 6,349,174 | B1 | * | 2/2002 | Ray et al. ................... 396/106 |
| 6,456,793 | B1 | * | 9/2002 | Ray et al. ..................... 396/89 |
| 6,584,283 | B2 | * | 6/2003 | Gabello et al. ............. 396/109 |

FOREIGN PATENT DOCUMENTS

WO  WO 01/63914 A1  8/2001  .......... H04N/5/235

OTHER PUBLICATIONS

U.S. patent application Ser. No. 09/631,160, Ray et al., filed Aug. 3, 2000.

"Innovative range imager sees how targets measure up: For smart weapons and civilian uses too" by Ken Frazier. Sandia Lab News, vol. 46, No. 19, Sep. 14, 1994.

"High Dynamic Range Imaging: Spatially Varying Pixel Exposures" by Shree K. Nayar and Tomoo Mitsunaga Proceedings of Computer Vision and Pattern Recognition 2000, pp. 472–479.

* cited by examiner

*Primary Examiner*—David Porta
*Assistant Examiner*—Patrick J. Lee
(74) *Attorney, Agent, or Firm*—David M. Woods (57) ABSTRACT

A scannerless range imaging system includes an illumination system for illuminating a scene with modulated illumination of a predetermined modulation frequency, and an image intensifier receiving reflected modulated illumination and including a modulating stage for modulating the reflected modulated illumination from the scene with the predetermined modulation frequency. An image responsive element includes an array of individual pixels for capturing images output by the image intensifier, whereby the modulation of the reflected modulated illumination incorporates a phase delay corresponding to the distance of objects in the scene from the range imaging system. A transmittance filter, including a plurality of filter elements having a spatially varying pattern of transmittance, are arranged in a one-to-one mapping with respect to the pixels forming the image responsive element. The spatially varying pattern of transmittance provides a plurality of separate exposures which are subsequently combined to form an output image with an expanded dynamic range.

15 Claims, 6 Drawing Sheets

SCANNERLESS RANGE IMAGING SYSTEM HAVING HIGH DYNAMIC RANGE

FIELD OF THE INVENTION

The present invention relates to the field of three-dimensional image capture and, in particular, to image capture with a scannerless range imaging system having improved dynamic range.

BACKGROUND OF INVENTION

A means for acquiring range data of an entire scene without employing a range scanner was proposed in U.S. Pat. No. 4,935,616, entitled "Range Imaging Laser Radar", which issued Jun. 19, 1990 in the name of Marion W. Scott (and further described in the Sandia Lab News, vol. 46, No. 19, Sep. 16, 1994). Instead of scanning a scene, this system acquires range by taking repeated images under slightly altered exposure conditions. More specifically, the scannerless range imaging system disclosed therein uses either an amplitude-modulated high-power laser diode or an array of amplitude-modulated light emitting diodes (LEDs) to completely illuminate a target scene. Conventional optics confine the target beam and image the target onto a receiver, which includes an integrating detector array sensor having hundreds of elements in each dimension.

The range to a target is determined by measuring the phase shift of the reflected light from the target relative to the amplitude-modulated carrier phase of the transmitted light. To make this measurement, the gain of an image intensifier (in particular, a micro-channel plate) within the receiver is modulated at the same frequency as the transmitter, so the amount of light reaching the sensor (a charge-coupled device) is a function of the range-dependent phase difference. A second image is then taken without receiver or transmitter modulation and is used to eliminate non-range-carrying intensity information. Both captured images are registered spatially, and a digital processor is used to operate on these two frames to extract range. Consequently, the range associated with each pixel is essentially measured simultaneously across the whole scene.

The preferred method of estimating the range in the '616 patent uses a pair of captured images, one image with a destructive interference caused by modulating the image intensifier, and the other with the image intensifier set at a constant voltage. However, a more stable estimation method uses a series of at least three images, each with modulation applied to the image intensifier, as described in commonly assigned U.S. Pat. No. 6,118,946, entitled "Method and Apparatus for Scannerless Range Image Capture Using Photographic Film" and issued Sep. 12, 2000 in the names of Lawrence A. Ray and Timothy P. Mathers. In that patent, the distinguishing feature of each image is that the phase of the image intensifier modulation is unique relative to modulation of the illuminator. If a series of n images are to be collected, then the preferred arrangement is for successive images to have a phase shift of $2\pi/n$ radians (where n is the number of images) from the phase of the previous image. However, this specific shift is not required, albeit the phase shifts need to be unique. The resultant set of images is referred to as an image bundle. The range at a pixel location is estimated by selecting the intensity of the pixel at that location in each image of the bundle and performing a best fit of a sine wave of one period through the points. The phase of the resulting best-fitted sine wave is then used to estimate the range to the object based upon the wave-length of the illumination frequency, and the range from the camera to the object at a particular pixel can be readily ascertained.

Consequently, the analysis on the image bundle described by Ray et al. differs from the analysis proposed by Scott, requiring at least three images in the bundle. Additionally, the range resolution depends upon the ability to perform a least-squares-estimate of the data to a known functional form. If the data in the image is too noisy, because of under-exposure or over-exposure, the resulting range estimates will degrade. Since the system collects area-wide data in parallel it is often the case that one region will have adequate exposure levels, while other regions have less suitable exposure characteristics.

In both methods, the image is illuminated with an amplitude modulated light source. The optical path of the receiver is fitted with a optical system containing a micro-channel-plate, i.e., as in a night vision system, with the amplification of the reflected signal being modulated at the same frequency as the illuminator. In the method described by Ray et al., for the first image it is preferred not only that the illuminator and the receiver have the same frequency, but that the phase of the two devices match. Subsequent images are captured according to the method described by Ray et al. in a similar manner, but the relative phase relationship of the illuminator and the receiver are shifted by a known angle.

A digital imaging system is the preferred approach for implementing the range imaging system, since it is easier to control registration of all images within the image bundle in a digital imaging system. However, digital imagers have a limited number of exposure quantization levels, e.g., a standard consumer digital camera has 256 exposure quantization levels. In order to estimate the range, the variation of values at a given pixel within the image bundle have to be sufficient to dominate any noise within the system. In particular, if a pixel has several values that are at the maximum exposure levels, then the resulting range estimate is dubious. In general, a wider variation in the values at a pixel location in an image bundle is preferred.

It is often the situation in practice that some regions of the image bundle will have acceptable variations, while other regions will not have acceptable variations. It would be desirable to accommodate this problem. One approach is to collect multiple image bundles using a suite of exposure settings. Analysis of each image bundle is performed while maintaining a measure of performance, and then the range estimate at a particular pixel that has the best performance measure is selected. For instance, if four exposure periods are utilized, of say ¼ second, ½ second, 1 second and 2 seconds, then regions that are under-exposed with the ¼ second exposure period are likely to have better exposure characteristics in the image exposed at say 1 second. While this method does accomplish the objective, it has the limitation that the number of exposures quadruples and the time to estimate range more than quadruples. However, it is also the case that many digital imagers have more than adequate spatial resolution, and that a trade-off of spatial resolution for improved range resolution is not only feasible, but desirable as well.

Recently, an approach to improving dynamic range in visible images was proposed (see Shree K. Nayar and Tomoo Mitsunaga, "High Dynamic Range Imaging: Spatially Varying Pixel Exposures, Proceedings of Computer Vision and Pattern Recognition 2000 and International Publication No. WO 01/63914 A1, "Method and Apparatus for Obtaining High Dynamic Range Images," which published Aug. 30, 2001 in the names of Nayer and Mitsunaga).

Method and apparatus are described for obtaining relatively high dynamic range images using a relatively low dynamic range image sensor without significant loss of resolution. The image sensor has an array of light-sensing elements with different sensitivity levels in accordance with a predetermined varying sensitivity pattern for the array of light sensing elements. The predetermined varying sensitivity pattern is provided by employing a filter array prior to the imaging plane. In this case the filter array is a series of tiles, with each tile covering an area of 2×2 pixels. Each tile includes an array of transmittance filters providing a spatially varying pattern of transmittance.

SUMMARY OF THE INVENTION

It is an object of the invention to improve the range resolution of a scannerless range imaging system by using a high dynamic range imager.

The present invention is directed to overcoming one or more of the problems set forth above. Briefly summarized, according to one aspect of the invention, a scannerless range imaging system includes an illumination system for illuminating the scene with modulated illumination of a predetermined modulation frequency, whereby some of the modulated illumination is reflected from objects in the scene, and an image intensifier receiving the reflected illumination and including a modulating stage for modulating the reflected modulated illumination from the scene with the predetermined modulation frequency. An image responsive element includes an array of individual pixels for capturing images output by the image intensifier, whereby the modulation of the reflected modulated illumination incorporates a phase delay corresponding to the distance of objects in the scene from the range imaging system. A transmittance filter, including a plurality of filter elements having a spatially varying pattern of transmittance, are arranged in a one-to-one mapping with respect to the pixels forming the image responsive element. The spatially varying pattern of transmittance provides a plurality of separate exposures which are subsequently combined to form an output image with an expanded dynamic range.

The invention has the advantages of extending the useful dynamic range of a scannerless range imaging system without incurring the penalty of having to capture more images to populate the image bundle. The invention also allows for a color texture image to be collected, though requiring the filter transmittance to be tuned to the spectrum of the phosphor emitter in the micro-channel plate. The invention will also allow for range collection using cameras with more limited numbers of quantization levels.

These and other aspects, objects, features and advantages of the present invention will be more clearly understood and appreciated from a review of the following description of the preferred embodiments and appended claims, and by reference to the accompanying drawings.

DETAILED DESCRIPTION OF THE INVENTION

Because range imaging devices employing laser illuminators and capture devices (including image intensifiers and electronic sensors) are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as shown and described according to the invention in the following materials, software not specifically shown, described or suggested herein that is useful for implementation of the invention is conventional and within the ordinary skill in such arts.

Figure 7:
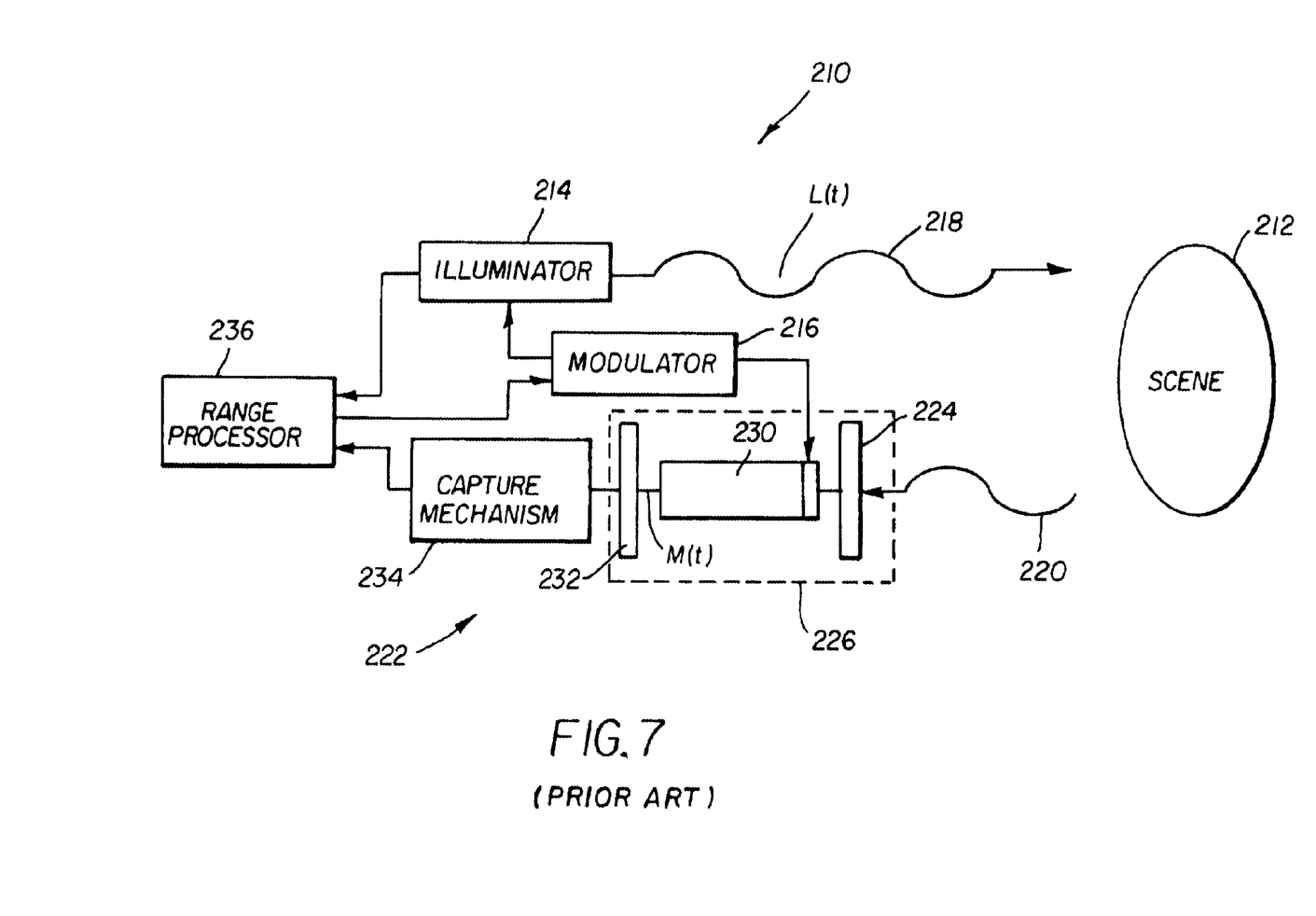
FIG. 7 is a block diagram of a known range imaging system which can be used to capture a bundle of images.

It is helpful to first review the principles and techniques involved in scannerless range imaging. Accordingly, referring first to FIG. 7, a range imaging system 210 is shown as a laser radar that is used to illuminate a scene 212 and then to capture an image bundle comprising a minimum of three images of the scene 212. An illuminator 214 emits a beam of electromagnetic radiation whose temporal frequency is controlled by a modulator 216. Typically, in the prior art, the illuminator 214 is a laser device which includes an optical diffuser in order to effect a wide-field illumination. The modulator 216 provides an amplitude varying sinusoidal modulation. The modulated illumination source is modeled by:

$$L(t)=\mu_L+\eta \sin(2\pi\lambda t) \qquad \text{(Eq. 1)}$$

where $\mu_L$ is the mean illumination, $\eta$ is the modulus of the illumination source, and $\lambda$ is the modulation frequency applied to the illuminator 214. The modulation frequency is sufficiently high (e.g., 12.5 MHz) to attain sufficiently accurate range estimates. The output beam 218 is directed toward the scene 212 and a reflected beam 220 is directed back toward a receiving section 222. As is well known, the reflected beam 220 is a delayed version of the transmitted output beam 218, with the amount of phase delay being a function of the distance of the scene 212 from the range imaging system. The reflected beam 220 strikes a photocathode 224 within an image intensifier 226, thereby producing a modulated electron stream proportional to the input amplitude variations. The amplification function of the image intensifier 226 is modeled by:

$$M(t)=\mu_M+\gamma \sin(2\pi\lambda t) \qquad \text{(Eq. 2)}$$

where $\mu_M$ is the mean intensification, $\gamma$ is the modulus of the intensification and $\lambda$ is the modulation frequency applied to the intensifier 226. The purpose of the image intensifier is not only to intensify the image, but also to act as a frequency mixer and shutter. Accordingly, the image intensifier 226 is connected to the modulator 216, causing the gain of a microchannel plate 230 to modulate. The electron stream from the photocathode 224 strikes the microchannel plate 230 and is mixed with a modulating signal from the modulator 216. The modulated electron stream is amplified through secondary emission by the microchannel plate 230. The intensified electron stream bombards a phosphor screen 232, which converts the energy into a visible light image. The intensified light image signal is captured by a capture mechanism 234, such as a charge-coupled device (CCD) or a photographic film. The captured image signal is applied to a range processor 236 to determine the phase delay at each point in the scene. The phase delay term ω of an object at a range ρ meters is given by:

$$\omega = \frac{2\rho\lambda}{c} \bmod 2\pi \qquad \text{(Eq. 3)}$$

where c is the velocity of light in a vacuum. Consequently, the amplitude of the reflected light at the input to the capture system is modeled by:

$$R(t) = \mu_L + \kappa \sin(2\pi\lambda t + \omega) \qquad \text{(Eq. 4)}$$

where κ is the modulus of illumination reflected from the object. The pixel response P at this point is an integration of the reflected light and the effect of the intensification:

$$P = \int_0^{2\pi} R(t)M(t)dt = 2\mu_L\mu_M + \kappa\pi\gamma\cos(\omega) \qquad \text{(Eq. 5)}$$

In the aforementioned Ray et al. patent (U.S. Pat. No. 6,118,946), which is incorporated herein by reference, at least three phase images (referred to as an image bundle) are collected. The phase of the intensifier 226 is shifted relative to the phase of the illuminator 214, and each of the phase images has a distinct phase offset. For this purpose, the range processor 236 is suitably connected to control the phase offset of the modulator 216, as well as the average illumination level and such other capture functions as may be necessary. If the image intensifier 226 (or laser illuminator 214) is phase shifted by $\theta_i$, the pixel response from equation (5) becomes:

$$P_i = 2\mu_L\mu_M\pi + \kappa\pi\gamma\cos(\omega + \theta_i) \qquad \text{(Eq. 6)}$$

It is desired to extract the phase term ω from the expression. However, this term is not directly accessible from a single image. In equation (6) there are three unknown values and the form of the equation is quite simple. As a result, mathematically only three samples (from three images) are required to retrieve an estimate of the phase term, which is proportional to the distance of an object in the scene from the imaging system. Therefore, a set of three images captured with unique phase shifts is sufficient to determine ω. For simplicity, the phase shifts are given by $\theta_k = 2\pi k/3$; k=0,1,2. In the following description, an image bundle shall be understood to constitute a collection of images which are of the same scene, but with each image having a distinct phase offset obtained from the modulation applied to the intensifier 226. It should also be understood that an analogous analysis can be performed by phase shifting the illuminator 214 instead of the intensifier 226. If an image bundle comprising more than three images is captured, then the estimates of range can be enhanced by a least squares analysis using a singular value decomposition (see, e.g., W. H. Press, B. P. Flannery, S. A. Teukolsky and W. T. Vetterling, *Numerical Recipes* (*the Art of Scientific Computing*), Cambridge University Press, Cambridge, 1986).

If images are captured with n≧3 distinct phase offsets of the intensifier (or laser or a combination of both) these images form an image bundle. Applying Equation (6) to each image in the image bundle and expanding the cosine term (i.e., $P_1 - 2\mu_L\mu_M\pi + \kappa\pi\gamma(\cos(\omega)\cos(\theta_i) - \sin(\omega)\sin(\theta_i))$) results in the following system of linear equations in n unknowns at each point:

$$\begin{pmatrix} P_1 \\ P_2 \\ \vdots \\ P_n \end{pmatrix} = \begin{pmatrix} 1 & \cos\theta_1 & -\sin\theta_1 \\ 1 & \cos\theta_2 & -\sin\theta_2 \\ \vdots & \vdots & \vdots \\ 1 & \cos\theta_n & -\sin\theta_n \end{pmatrix} \begin{pmatrix} \Lambda_1 \\ \Lambda_2 \\ \Lambda_3 \end{pmatrix} \qquad \text{(Eq. 7)}$$

where $\Lambda = 2\mu_L\mu_M\pi$, $\Lambda_2 = \kappa\pi\gamma\cos\omega$, and $\Lambda_3 = \kappa\pi\gamma\sin\omega$. This system of equations is solved by a singular value decomposition to yield the vector $\Lambda = [\Lambda_1, \Lambda_2, \Lambda_3]^T$. Since this calculation is carried out at every (x,y) location in the image bundle, Λ is really a vector image containing a three element vector at every point. The phase term ω is computed at each point using a four-quadrant arctangent calculation:

$$\omega = \tan^{-1}(\Lambda_3, \Lambda_2) \qquad \text{(Eq. 8)}$$

The resulting collection of phase values at each point forms the phase image. Once phase has been determined, range r can be calculated by:

$$r = \omega \frac{c}{4\pi\lambda} \qquad \text{(Eq. 9)}$$

Equations (1)–(9) thus describe a method of estimating range using an image bundle with at least three images (i.e., n=3) corresponding to distinct phase offsets of the intensifier or illuminator.

However, as described in the background section, since the range resolution depends upon the ability to perform a least-squares-estimate of the data to a known functional form, if the data in the image is too noisy, because of under-exposure or over-exposure, the resulting range estimates will degrade. Since the system collects data in parallel it is often the case that one region will have adequate exposure levels, while other regions have less suitable exposure characteristics.

Figure 1:
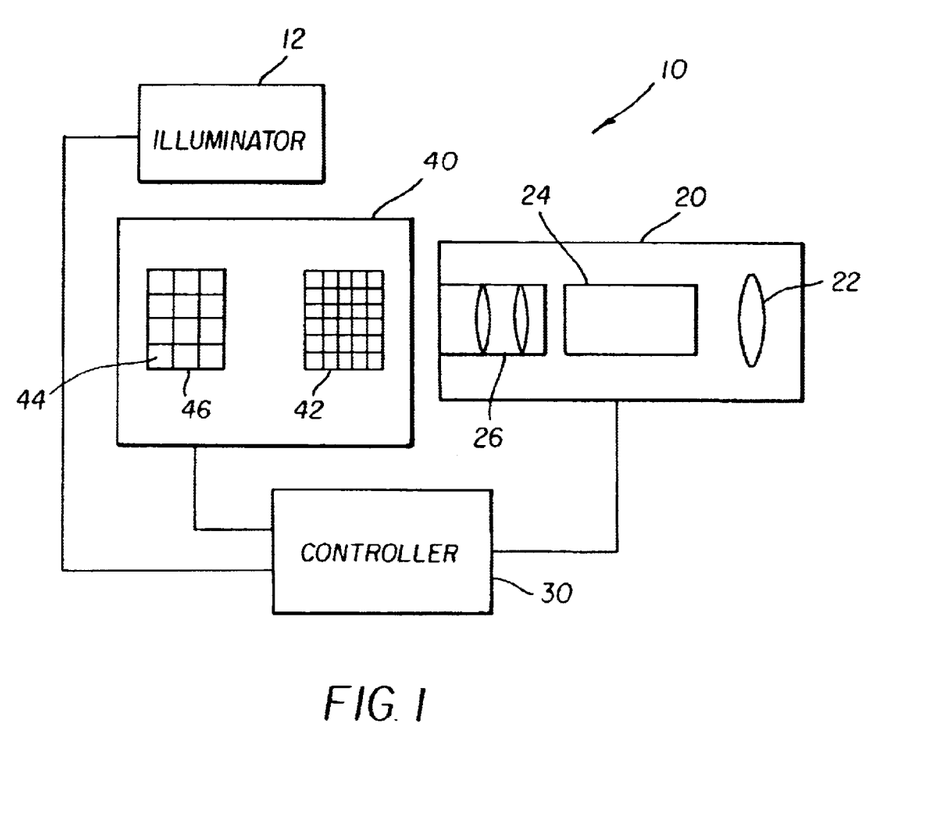
FIG. 1 shows the main components of a scannerless range imaging system with improved dynamic range in accordance with the invention.

Referring to FIG. 1, a block diagram is presented of a scannerless range imaging system with improved dynamic range in accordance with the invention, in particular showing a general configuration of a scannerless range imager 10 utilizing a filter array 42 to implement a predetermined varying sensitivity pattern for an array of light sensing pixels 44 comprising the digital imager 46 utilized by the range imager. In the preferred embodiment, the range imager 10 incorporates an illuminator 12 as a light source, using either a laser or an ensemble of light-emitting-diodes (LED's) preferably operating in the infrared portion of the spectrum, e.g., at approximately 830 nm. wavelength. The energy emitted by the illuminator is amplitude modulated at a high frequency, e.g., 12.5 MHz., with an output adequate to illuminate a target and provide a reflected signal that can be detected by a receiver 40. For instance, an illumination output of 600 milliwatts has been shown to be adequate for objects within 40 feet of the system.

The amplitude modulation of the system is typically selected to accommodate the expected variation in the range of objects of interest and the desired range resolution. A higher frequency modulation implies a superior range resolution, but the distance between ambiguous range estimates diminishes. Similarly, the ambiguity of range data is reduced with a lower frequency, but consequently, the range resolution is reduced. The optical portion of the receiver 20 is comprised of a lens 22, a micro-channel-plate 24 and (optionally) relay optics 26. The lens is typically a standard lens used for standard photographic applications, but it is desirable that the lens have minimal lens distortions. Typically, the lens 22 is fitted with a notched filter matching the wavelength of the emitted radiation, e.g., 830 nm. This has the effect of greatly reducing the deleterious effects of ambient light, as the ambient light does not carry any range information.

The micro-channel-plate 24 acquires photons and converts the photons into electrons. The electrons are then amplified and the amount of amplification can be controlled. It is preferable to modulate the gain at the same frequency as the amplitude-modulated light emitted by the illuminator 12. It is also necessary that the relative phase between the illumination provided by the illuminator 12 and the gain of the micro-channel-plate 24 be known and controlled. The micro-channel-plate 24 then converts the electrons back into photons as they impinge on a phosphor screen that emits light that is detectable by the subsequent image collection subsystem, i.e., the imager 46. In some applications, it is desirable to have a set of relay optics 26 to transmit the output of the phosphor screen to the imager 46, though this is not always the case. Otherwise, the phosphor screen may be bonded to the imager 46 by a fiber-optic bundle (not shown). It will be clear that either option can be used with the present invention.

A receiver 40 includes the filter array 42 and the imager 46. The filter array will 42 be described subsequently; the imager 46 is preferably a digital image sensor such as a CCD or a CMOS image sensor, either of which are commonly available. A controller 30 is use to coordinate the system, and has the responsibility for managing the relative phase alignment between the illuminator 12 and the micro-channel-plate 24, as well as controlling the exposure period of the imager 46. Other functions may be managed by the controller 30, such as sensing light levels that would negatively impact the micro-channel-plate 24.

Figure 2A:
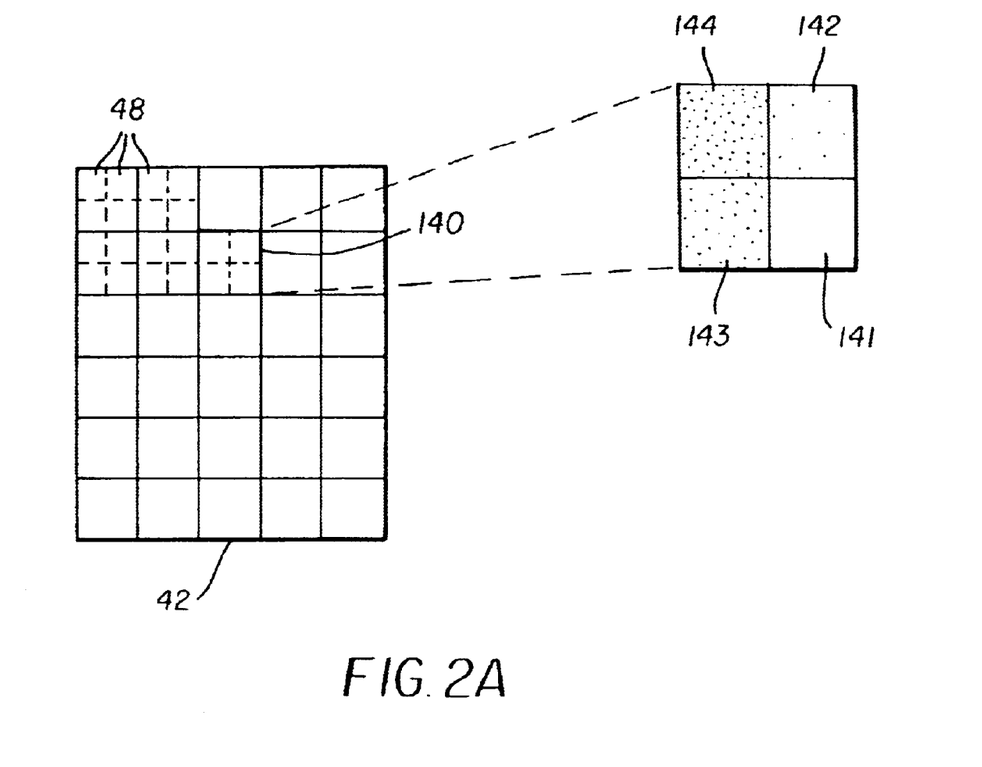
FIGS. 2A and 2B show two versions of a tiled filter array for implementing a predetermined spatially varying sensitivity pattern for a digital imager included in the range imaging system shown in FIG. 1.

Referring to FIG. 2A, the filter array 42 is shown as a set of individual transmittance filters 48 that are aligned with the pixels 44 of the imager 46 in a one-to-one mapping. That is, each pixel has a uniquely associated transmittance filter within the filter array. Such a construction, that is, a one-to-one mapping of a filter element to a photosensitive pixel, has been used with color filter arrays in a wide variety of color digital cameras. The filter array 42 is decomposed into a set of tiles 140 that are repeated to form the filter array 42. Each tile includes a set of individual transmittance filters 141, 142, 143 and 144, each with a unique transmittance property. In the preferred embodiment, the transmittance of the individual filters are reduced by powers of ½, hence for a tile 140 with four filters 141, 142, 143 and 144 the transmittances should be 100%, 50%, 25% and 12.5%, respectively. How the individual filters are arranged within a tile is not critical, but the arrangement should be identical in each tile of the filter array.

Figure 2B:
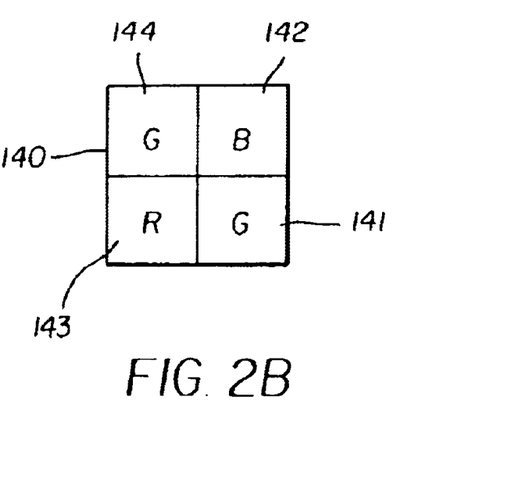

It should be recognized that the transmittance of the individual filters is relative to the spectrum of the color emitted by the phosphor plate. Consequently, the filters may have other properties. In particular, in cases where the camera is also intended to record a color texture image, the filters in the array can also share the properties of a standard color filter array. One common arrangement is the Bayer pattern (as disclosed in U.S. Pat. No. 3,971,065, which is incorporated herein by reference); as shown in FIG. 2B, such a filter array will have two (144, 141) of the filters in a tile 140 transmitting green, one (143) transmitting red and the other (142) transmitting blue. The color properties are retained, but transmittance of the typically green phosphor of the micro-channel-plate will be spatially variable according to the aforementioned transmittance levels. However, an image intensifier operates by converting photonic energy into a stream of electrons, amplifying the number of electrons within this stream and then converting the electrons back into photonic energy via a phosphor plate. One consequence of this process is that color information is lost. Since the filter array shown in FIG. 2B is intended to provide a color texture image, a means of acquiring the color information that is registered along with the range information must be provided for such an embodiment.

One approach to acquiring color is described in copending U.S. patent application Ser. No. 09/631,601, entitled "Method and Apparatus for a Color Scannerless Range Imaging System", which was filed Aug. 3, 2000 in the names of Lawrence A. Ray and Louis R. Gabello. In this application, a color filter array is introduced prior to the photo-cathode on the microchannel plate in the intensifier, where the color filter array is matched to the spatial channel pattern of the microchannel plate in order to provide the intensifier with the capability of producing color images. The color filter array, which comprises a pattern of four distinct color filters, e.g., red, blue, green and infrared filters, is arranged into a hexagonal lattice designed to match the channel pattern of the microchannel plate. As is well known, the sensitivity of an image intensifier is partly derived from the fact that the photocathode is mostly responsive to near-infrared radiation (400–900 nanometers), part of which is invisible to the human eye. Accordingly, the modulated illumination is restricted to the infra-red region, and the visible region separated by the color filter array is therefore substantially unaffected by the modulation. The present invention may be practiced by incorporating the aforementioned spatially varying transmittance pattern into the infra-red elements in the color filter array. Alternatively, the aforementioned Bayer array shown in FIG. 2B may be employed as the color filter array, where the spatially varying transmittance pattern is incorporated into the color elements.

Another approach is described in detail in U.S. Pat. No. 6,349,174 entitled "Method and Apparatus for a Color Scannerless Range Image System" and issued Feb. 19, 2002 in the names of Lawrence Allen Ray and Louis R. Gabello. In this system, a primary optical path is established for directing image light toward a single image responsive element. A beamsplitter located in the primary optical path separates the image light into two channels, a first channel including an infrared component and a second channel including a color texture component. One of the channels continues to traverse the primary optical path and the other channel traverses a secondary optical path distinct from the primary path. A modulating element is operative in the first channel to receive the infrared component and a modulating signal, and to generate a processed infrared component with phase data indicative of range information. An optical network is provided in the secondary optical path for recombining the secondary optical path into the primary optical path such that the processed infrared component and the color texture component are directed toward the single image responsive element. The present invention may be practiced by incorporating the aforementioned spatially varying transmittance filter array into the first channel. In addition, the color filter array providing the color texture component in the second channel may incorporate the spatially varying transmittance pattern shown in FIG. 2B. The advantage of the latter construction therefore is that increased dynamic range may be realized in both the range component and the color texture component.

Figure 3:
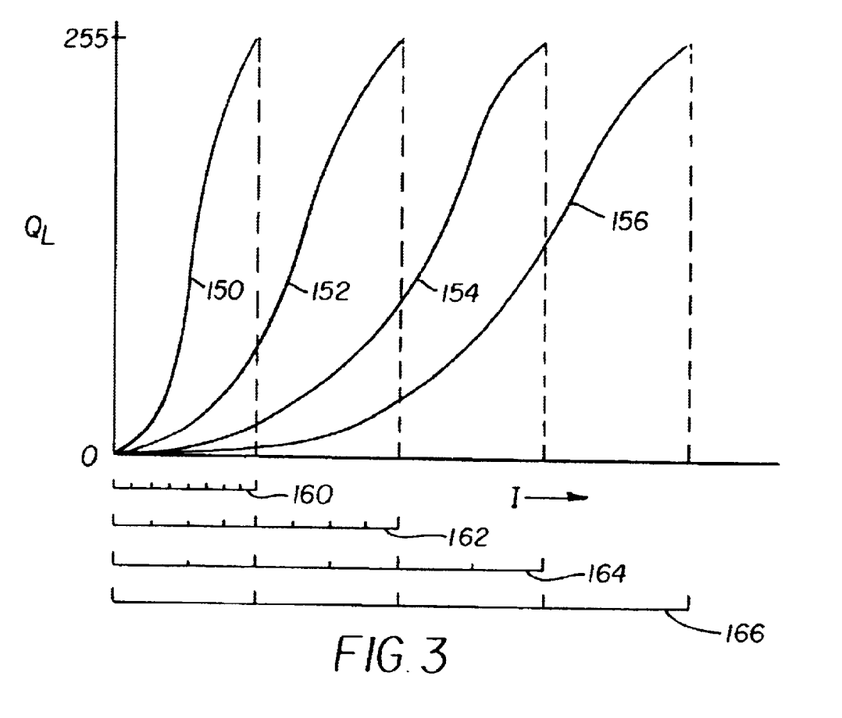
FIG. 3 shows the effective quantization levels relative to the output radiance from a micro-channel plate included in the range imaging system shown in FIG. 1.

Referring to FIG. 3, the effective quantization levels $Q_L$ relative to the output I from the micro-channel plate is shown. The spatially varying exposure pattern of the imaging system measures output radiance I from the microchannel plate 24 using different exposures 150, 152, 154 and 156. In the pattern shown in FIG. 3, four exposures are used (corresponding to the four transmittance filters 141, 142, 143 and 144) such that the maximum output exposure 150 (corresponding to the maximum transmittance filter 141) measures low phosphor plate radiance without dropping into the noise, and therefore with high resolution, while the minimum exposure 156 (corresponding to the minimum transmittance filter 144) measures high phosphor plate radiance without saturation, and therefore also with high resolution. When information from the four exposures are used together, an expanded dynamic range is obtained for the output from the micro channel plate 24. Thus, for the pixel under a filter of maximum transmittance the quantization levels are the most finely spaced, as indicated graphically by the finely spaced quantization bands 160. This is preferred for regions of low levels of reflected light. However, since the number of quantization levels is fixed and finite, it is also conceivable that in regions reflecting more illuminated light that the pixel under the filter with the highest transmittance will become saturated. The second set of quantization bands 162 is more widely spaced than the first and has a greater dynamic range, but with the penalty of having less ability to resolve light levels. Subsequent quantization bands 164 and 166 continue this progression and satisfy this same property. However, as a result, when information from the four exposures are used together the dynamic range of the system is improved by a factor of four.

Figure 4:
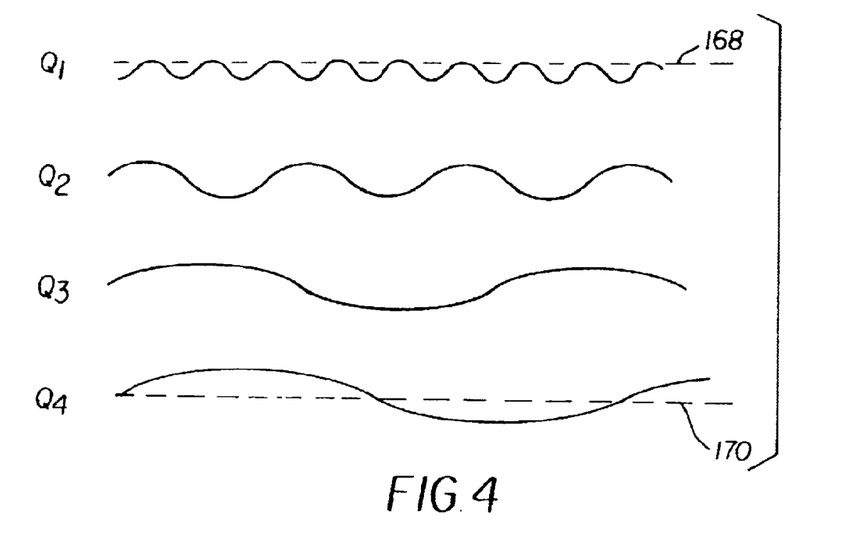
FIG. 4 shows an example of signal variation provided by the filter array shown in FIG. 2.

Referring to FIG. 4, consider the pixels $Q_1 \ldots Q_4$ under a single tile 140 within the filter array. Since the imager collects a set of images within the so-called image-bundle each pixel has a bundle of illumination values, referred to here as the pixel bundle. In order to simplify the discussion, consider the objects and overall illumination reflected from the object being identical prior to the filter array. The only difference between the pixel bundles associated with a tile of the filter array are caused by the transmittance levels of the individual filters. The preferred method to estimate range is a least-squares-estimation process. In order to obtain the best results it is preferable that the pixel bundle have as much variation as possible, yet not have levels that are at the minimum or maximum quantization levels. For an eight-bit imager, it is undesirable for pixel values to be either zero or 255. With the described arrangement there are four pixel bundles with illumination samples at different ranges. The preferred method will pick the sample that has the maximum variation, but does not have values with 0 or maximum pixel value. This will select a pixel bundle most free from imager noise and the dynamic range resolution of the imager. For instance, as shown in exemplary form in FIG. 4, pixel $Q_1$ corresponds to the maximum exposure 150 and is clipped at a saturation level 168, while pixel $Q_4$ corresponds to the minimum exposure 156 and drops into a noise level 170. Accordingly, the values associated with pixels $Q_3$ and $Q_4$ contain enough variation to be useful in the least squares estimation process.

Figure 5A:
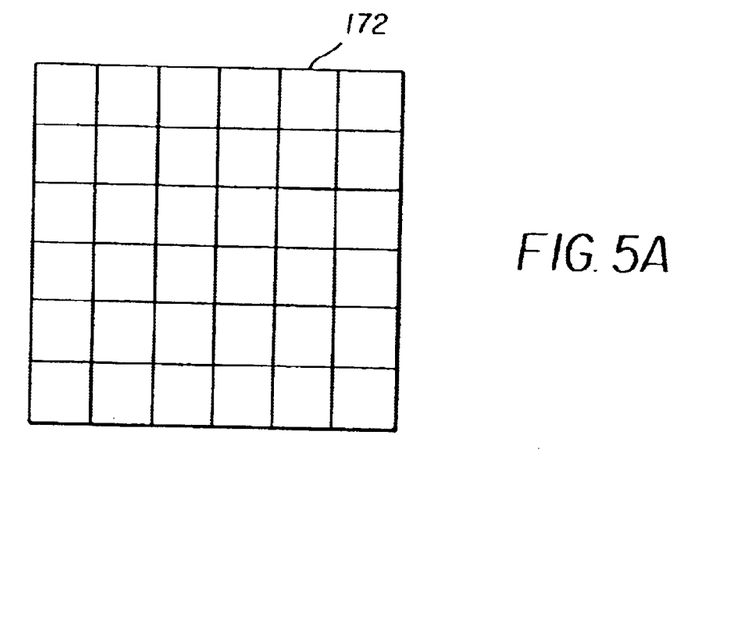
FIGS. 5A, 5B and 5C illustrate different lattice locations for the range information resulting from the tiled filter array shown in FIG. 2.
Figure 5B:
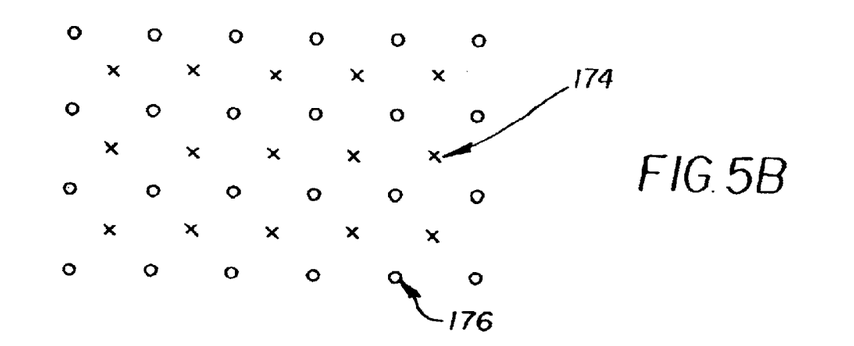
Figure 5C:
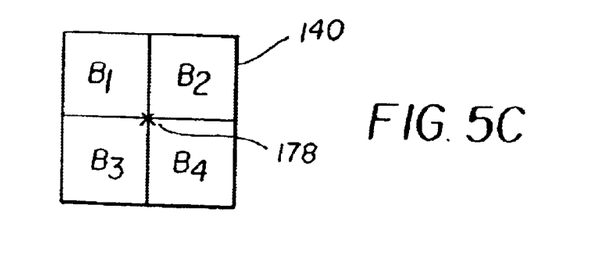

Referring to FIG. 5A, the set of pixel locations of the imager is typically a square lattice 172. With the approach described above, the range lattice estimates 174 also form a square lattice, but are effectively offset as shown in FIG. 5B to a point midway within a set of four neighboring pixels in an imager lattice 176. This is not a problem in most situations. Alternatively, as shown in FIG. 5C, a single range estimate 178 can be formed from elements $B_1 \ldots B_4$ for each tile 140, and effectively maintain the same lattice, but with half the period in both spatial directions.

Figure 6A:
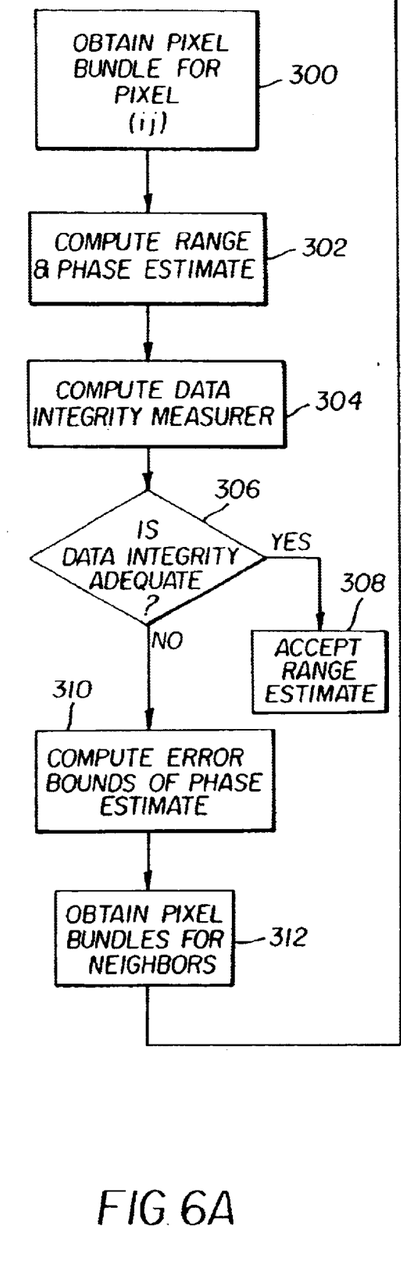
FIGS. 6A and 6B show a logical flowchart for selecting a range estimate at a pixel location.
Figure 6B:
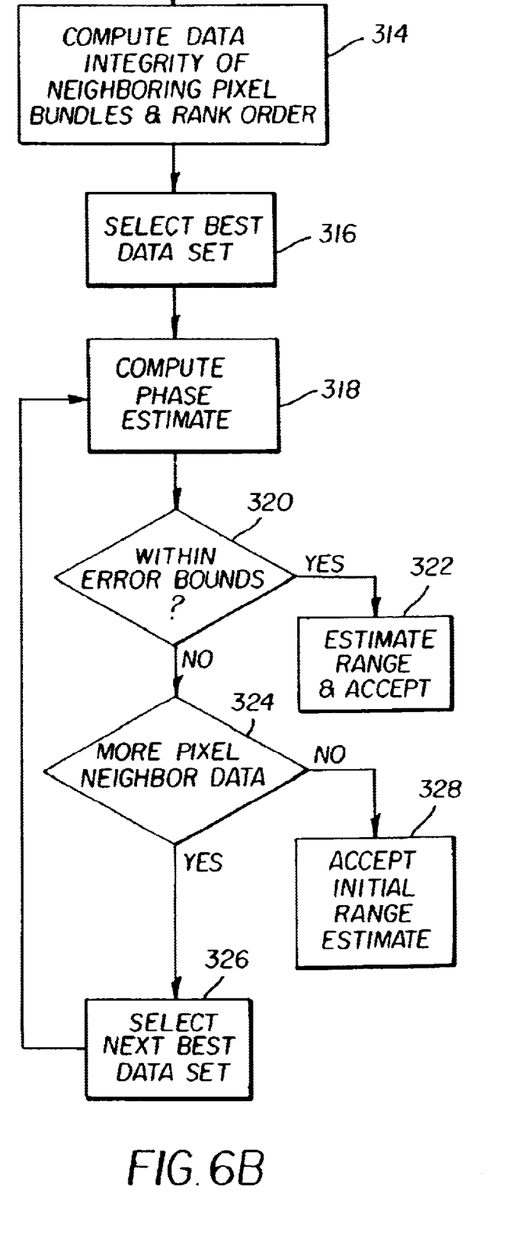

Referring to FIGS. 6A and 6B, a logical flowchart is shown for selecting the range estimate at pixel location (i,j). Each pixel has an associated pixel bundle as previously described. Obtain the pixel bundle for pixel (i,j) (300) and compute the range and phase estimate (302) from this pixel bundle. The method for accomplishing this was previously described. Then compute measures of data integrity (304). There are a number of methods for performing this task including, but not limited to, measuring the correlation of the fitted data to the pixel bundle data, determining the number of pixels that are clipped, how many pixels have a low signal-to-noise ratio, and so on. It will be appreciated that there are variations on this measure, though the preferred method is the product of the correlation and the proportion of samples in the pixel bundle not clipped, or with a low SNR to the total samples in the pixel bundle. This measure is referred to as the data integrity measure. If the data integrity measure is deemed adequate (306), e.g., above a threshold, then the range estimate is accepted (308). If not, then an error bound of the range estimate is formed (310) using standard statistical methods. Subsequently, the pixels bundles for neighboring pixels (e.g., 8 nearest neighbors) are retrieved (312). For each, the data integrity measure is computed and the results are rank ordered (314). The best of these is selected (316) and a phase estimate is made (318). If the phase estimate is within the error bounds of the initial pixel bundle (320), then this pixel bundle is accepted and a range estimate is made (322) and accepted. If not, then if more of the neighboring pixel bundles have not been fully processed (324), then the next best pixel bundle from the rank ordered list is selected (326) and the evaluation process performed. If all neighboring pixel bundles have been evaluated and one has not been selected, then the initial range estimate is accepted (328).

The invention has been described with reference to a preferred embodiment. However, it will be appreciated that variations and modifications can be effected by a person of ordinary skill in the art without departing from the scope of the invention.

Parts List 10 range imager
12 illuminator
20 receiver
22 lens
24 microchannel plate
26 relay optics
30 controller
40 receiver
42 filter array
44 image pixels
46 digital imager
48 transmittance filters
140 tile
141 maximum transmittance filter
142 intermediate transmittance filter
143 intermediate transmittance filter
144 minimum transmittance filter
150 maximum exposure 152 intermediate exposure
154 intermediate exposure
156 minimum exposure
160 finely spaced quantization bands
162 intermediate spaced quantization bands
164 intermediate spaced quantization bands
166 widely spaced quantization bands
168 saturation level
170 noise level
172 square lattice
174 range lattice estimates
176 imager lattice
178 single range estimate
210 range imaging system
212 scene
214 illuminator
216 modulator
218 output beam
220 reflected beam
222 receiving section
224 photocathode
226 image intensifier
230 microchannel plate
232 phosphor screen
234 capture mechanism
236 range processor
300 logical flowchart steps
to
328 logical flowchart steps

What is claimed is:

1. A scannerless range imaging system having extended dynamic range for capturing range information from illumination reflected from a scene, said scannerless range imaging system comprising:

an illumination system for illuminating the scene with modulated illumination of a predetermined modulation frequency, whereby some of the modulated illumination is reflected from objects in the scene;

an image intensifier receiving the reflected illumination and including a modulating stage for modulating the reflected modulated illumination from the scene with the predetermined modulation frequency;

an image responsive element arranged in an optical path of the image intensifier, said image responsive element including an array of individual pixels for capturing images output by the image intensifier, including at least one image corresponding to the reflected modulated illumination, whereby the modulation of the reflected modulated illumination incorporates a phase delay corresponding to the distance of objects in the scene from the range imaging system; and a transmittance filter including a plurality of filter elements having a spatially varying pattern of transmittance, said filter elements arranged in a one-to-one mapping with respect to the pixels forming the image responsive element, whereby the spatially varying pattern of transmittance provides a plurality of separate exposures which are subsequently combined to form an output image with an expanded dynamic range.

2. The range imaging system claimed in claim 1 wherein said plurality of filter elements are arranged in a pattern of tiles, each tile containing a predetermined group of filter elements each providing a different level of transmittance.

3. The range imaging system as claimed in claim 1 wherein the transmittance filter is arranged on the image responsive element.

4. The range imaging system as claimed in claim 1 further comprising relay optics for imaging the output of the image intensifier onto the image responsive element.

5. The range imaging system as claimed in claim 1 wherein the transmittance filter includes color filter elements for generating a color texture image.

6. The range imaging system as claimed in claim 1 wherein the image intensifier includes a micro-channel plate.

7. The range imaging system as claimed in claim 1 wherein the image responsive element is an electronic image sensor.

8. The range imaging system as claimed in claim 1 further comprising means for storing the range images as a bundle of associated images.

9. The range imaging system as claimed in claim 1 wherein the image responsive element captures a plurality of range images corresponding to the reflected modulated illumination, wherein each range image incorporates the effect of the predetermined modulation frequency together with a phase offset unique for each image.

10. The range imaging system as claimed in claim 9 wherein each unique phase offset $\theta$ is given by $\theta_i = 2\pi i/3$; $i=0,1,2$.

11. The range imaging system as claimed in claim 1 wherein the illumination system includes a laser illuminator for producing the modulated illumination.

12. The range imaging system as claimed in claim 1 wherein the illumination system includes a plurality of light emitting diodes for producing the modulated illumination.

13. The range imaging system as claimed in claim 1 wherein the image intensifier includes a phosphor plate for emitting the intensified and modulated light and the transmittance filter is responsive within the spectrum of the phosphor plate.

14. A color scannerless range imaging system having extended dynamic range for capturing range information and color information from illumination reflected from a scene, said scannerless range imaging system comprising:

an illumination system for illuminating the scene with modulated illumination of a predetermined modulation frequency, whereby some of the modulated illumination is reflected from objects in the scene;

an image intensifier receiving the reflected illumination and including a modulating stage for modulating the reflected modulated illumination from the scene with the predetermined modulation frequency;

an image responsive element arranged in an optical path of the image intensifier, said image responsive element including an array of individual pixels for capturing images output by the image intensifier, including at least one image corresponding to the reflected modulated illumination, whereby the modulation of the reflected modulated illumination incorporates a phase delay corresponding to the distance of objects in the scene from the range imaging system; and a transmittance filter including a plurality of color filter elements having a spatially varying pattern of transmittance and arranged relative to the image intensifier to provide a color texture image, said color filter elements arranged in a one-to-one mapping with respect to the pixels forming the image responsive element, whereby the spatially varying pattern of transmittance provides a plurality of separate color exposures which are subsequently combined to form an output image with an expanded dynamic range.

15. A method for obtaining high resolution range estimates in a scannerless range imaging system from a group of pixels having a spatially varying pattern of exposure provided by a transmittance filter overlying the pixels, wherein the system collects a bundle of images and each pixel has a corresponding bundle of illumination values, said method comprising the steps of:

(a) computing data comprising an initial range estimate and an initial phase estimate from a bundle of illumination values for a first pixel in the group;

(b) computing a data integrity measure for the bundle of illumination values from the first pixel, wherein the data integrity measure includes at least one of a correlation of fitted data, a determination of the number of pixels that are clipped, or a determination of the number of pixels having a low signal-to-noise ratio;

(c) accepting the initial range estimate if the data integrity measure is deemed adequate relative to an integrity threshold;

(d) if the bundle of illumination values is not acceptable, forming an error boundary relative to the initial range estimate;

(e) computing data integrity measures for the bundles of illumination values for neighboring pixels in the group and rank ordering the results;

(f) computing a phase estimate for the highest ranked pixel;

(g) accepting the phase estimate for the highest ranked pixel if the phase estimate is within the error boundary;

(h) otherwise, repeating steps (f) and (g) for the other neighboring pixels until an acceptable phase estimate is determined; and (i) utilizing the phase estimate with other phase estimates similarly generated from other groups of pixels to provide a plurality of separate exposures which are subsequently combined to form an output image with an expanded dynamic range.

* * * * *